(12) United States Patent
Murray

(10) Patent No.: US 9,846,281 B2
(45) Date of Patent: Dec. 19, 2017

(54) ADAPTER FOR INSPECTION OF FIBER OPTIC CABLES

(71) Applicant: TYCO ELECTRONICS UK LTD., Swindon, Wiltshire (GB)

(72) Inventor: David Patrick Murray, Bristol (GB)

(73) Assignee: CommScope Connectivity UK Limited (GB)

( * ) Notice: Subject to any disclaimer, the term of this patent is extended or adjusted under 35 U.S.C. 154(b) by 0 days.

(21) Appl. No.: 15/024,299

(22) PCT Filed: Sep. 22, 2014

(86) PCT No.: PCT/EP2014/070090
§ 371 (c)(1),
(2) Date: Mar. 23, 2016

(87) PCT Pub. No.: WO2015/040206
PCT Pub. Date: Mar. 26, 2015

(65) Prior Publication Data
US 2016/0246011 A1    Aug. 25, 2016

Related U.S. Application Data

(60) Provisional application No. 61/881,291, filed on Sep. 23, 2013, provisional application No. 61/881,417, filed on Sep. 23, 2013.

(51) Int. Cl.
*G02B 6/38*      (2006.01)
*G01M 11/08*   (2006.01)
*G02B 6/36*      (2006.01)

(52) U.S. Cl.
CPC .......... *G02B 6/385* (2013.01); *G01M 11/088* (2013.01); *G02B 6/3608* (2013.01); *G02B 6/3825* (2013.01); *G02B 6/3879* (2013.01)

(58) Field of Classification Search
CPC .... G02B 6/385; G02B 6/3608; G02B 6/3825; G02B 6/3879; G01M 11/088
USPC .... 385/60, 90, 133–134; 359/368, 382, 379, 359/694, 384
See application file for complete search history.

(56) References Cited

U.S. PATENT DOCUMENTS

| 5,459,564 A * | 10/1995 | Chivers | G01B 9/04 356/477 |
| 5,724,127 A * | 3/1998 | Csipkes | G01M 11/31 356/73.1 |
| 5,731,893 A * | 3/1998 | Dominique | G02B 6/3807 359/379 |

(Continued)

OTHER PUBLICATIONS

International Search Report and Written Opinion for International Application No. PCT/EP2014/070090 mailed Dec. 22, 2014 (11 pages).

*Primary Examiner* — Ryan Lepisto
*Assistant Examiner* — Guy Anderson
(74) *Attorney, Agent, or Firm* — Merchant & Gould P.C.

(57) ABSTRACT

An example system for inspecting fiber optic cables includes: a fixture including a body configured to hold a plurality of fiber optic cables, the fixture including a front portion defining a plurality of apertures positioned adjacent to ends of the fiber optic cables; and an adapter including two or more pin members extending therefrom, the two or more pin members being configured to be positioned in two or more of the plurality of apertures in the fixture to hold the fixture relative to the adapter.

9 Claims, 9 Drawing Sheets

(56) References Cited

U.S. PATENT DOCUMENTS

| | | | | |
|---|---|---|---|---|
| 5,770,001 A * | 6/1998 | Nagayama | ............ | G02B 6/3833 |
| | | | | 156/350 |
| 6,412,987 B1 * | 7/2002 | Horwitz | ............... | G02B 6/3825 |
| | | | | 356/244 |
| 6,466,366 B1 * | 10/2002 | Dominique | .......... | G02B 6/3807 |
| | | | | 356/73.1 |
| 6,751,017 B2 * | 6/2004 | Cassady | ............. | G02B 21/0016 |
| | | | | 359/368 |
| 6,879,439 B2 * | 4/2005 | Cassady | ............. | G02B 21/0016 |
| | | | | 359/368 |
| 7,239,788 B2 * | 7/2007 | Villeneuve | ........... | G02B 6/3807 |
| | | | | 385/134 |
| 7,336,884 B2 * | 2/2008 | Zhou | .................... | G02B 6/3833 |
| | | | | 359/368 |
| 7,676,134 B2 * | 3/2010 | Kachmar | .............. | B24B 19/226 |
| | | | | 385/134 |
| 7,684,031 B2 * | 3/2010 | Yokota | ............... | G01N 21/9503 |
| | | | | 356/237.1 |
| 9,110,252 B2 * | 8/2015 | Zhou | .................... | G02B 6/3866 |
| 2003/0044141 A1 | 3/2003 | Melton et al. | | |
| 2003/0179447 A1 * | 9/2003 | Cassady | ............. | G02B 21/0016 |
| | | | | 359/391 |
| 2004/0038558 A1 | 2/2004 | Langouet et al. | | |
| 2004/0156099 A1 * | 8/2004 | Cassady | ............. | G02B 21/0016 |
| | | | | 359/368 |
| 2004/0197066 A1 * | 10/2004 | Daoud | ................. | G02B 6/4471 |
| | | | | 385/136 |
| 2005/0276558 A1 | 12/2005 | Bianchi et al. | | |
| 2010/0199447 A1 | 8/2010 | Mercado | | |
| 2013/0051733 A1 | 2/2013 | Gallegos et al. | | |
| 2015/0092043 A1 * | 4/2015 | Baribault | ............ | H04N 5/2252 |
| | | | | 348/125 |

* cited by examiner

ADAPTER FOR INSPECTION OF FIBER OPTIC CABLES

CROSS-REFERENCE TO RELATED APPLICATION(S)

This application is a National Stage of PCT/EP2014/070090, filed 22 Sep. 2014, which claims benefit of U.S. Patent Application Ser. No. 61/881,291 filed on Sep. 23, 2013 and U.S. Patent Application Ser. No. 61/881,417 filed on Sep. 23, 2013, and which applications are incorporated herein by reference. To the extent appropriate, a claim of priority is made to each of the above disclosed applications.

BACKGROUND

Fiber optic connectors are used to terminate the ends of fiber optic cables. There are many different fiber optic connector types. Example types of fiber optic connectors include FC-type, SC-type, ST-type and D4-type.

A typical connector includes a ferrule located inside the connector. The ferrule is a relatively long, thin cylinder made of a material such as ceramic. Other materials such as metal or plastic can also be used to make the ferrule. The ferrule defines a central opening sized to receive a fiber of a given cladding diameter. An epoxy is typically placed into the opening prior to inserting the fiber to hold the fiber in place. The ferrule functions to align and center the fiber, as well as to protect it from damage.

It is desirable to minimize the loss of signals passing through the fiber. Parameters for evaluating the performance of a connector include insertion loss and return loss. Insertion loss is the measurement of the amount of power that is transferred through a coupling from an input fiber to an output fiber. Return loss is the measurement of the amount of power that is reflected back into the input fiber. To enhance signal quality and therefore optimize insertion/return loss, it is desirable to inspect each connector during manufacture.

SUMMARY

In one aspect, an example system for inspecting fiber optic cables includes: a fixture including a body configured to hold a plurality of fiber optic cables, the fixture including a front portion defining a plurality of apertures positioned adjacent to ends of the fiber optic cables; and an adapter including two or more pin members extending therefrom, the two or more pin members being configured to be positioned in two or more of the plurality of apertures in the fixture to hold the fixture relative to the adapter.

DETAILED DESCRIPTION

Figure 1:
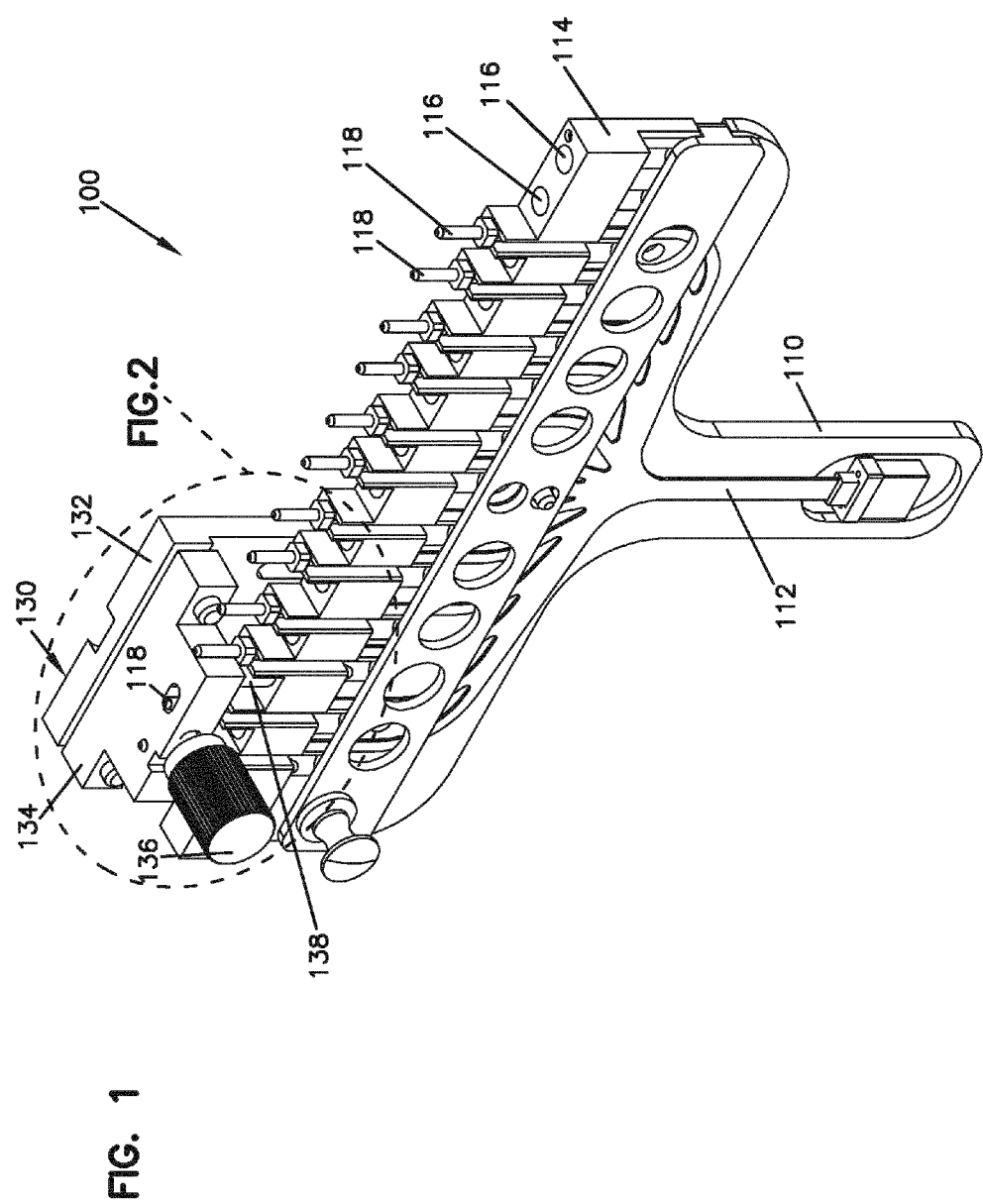
FIG. 1 is a top perspective view of an example system for inspecting fiber optic cables.
Figure 2:
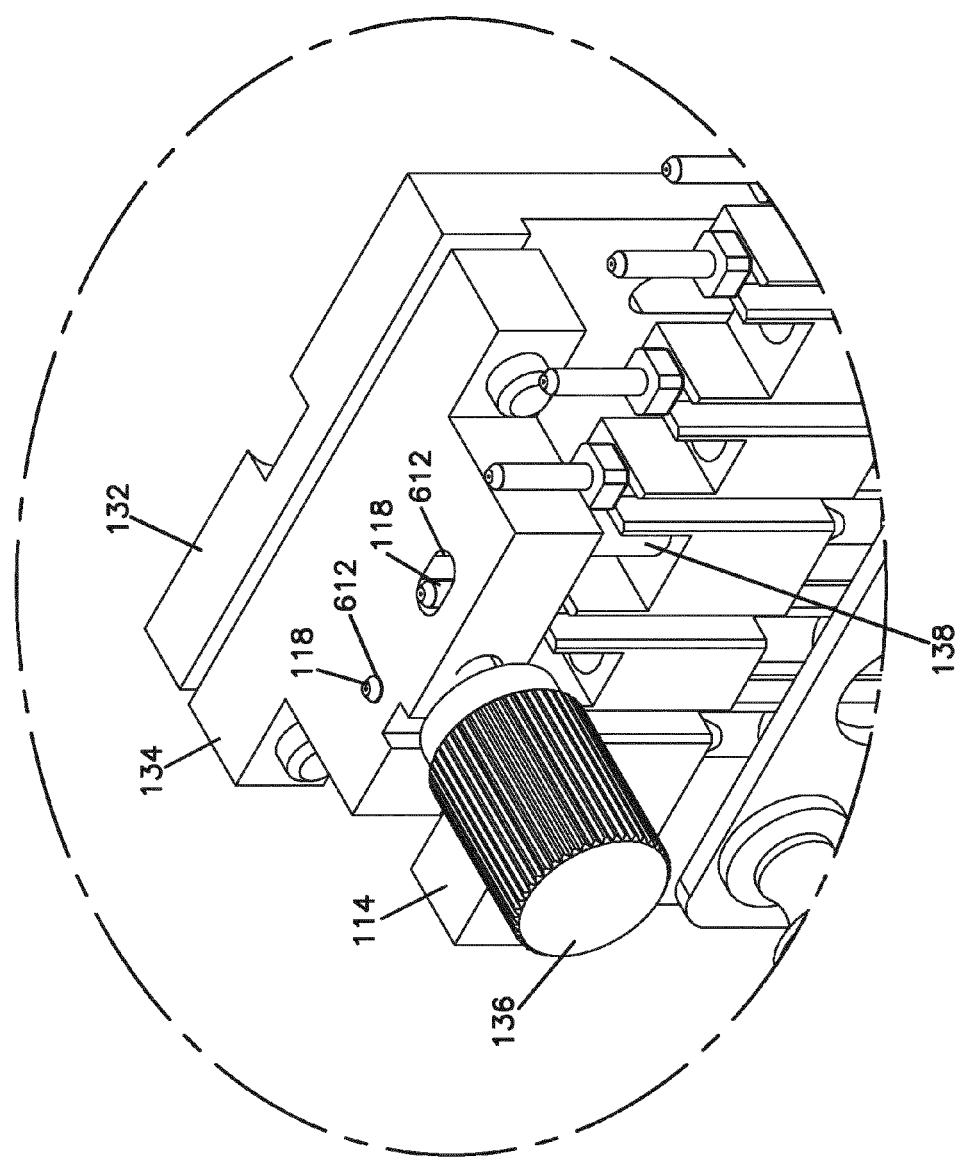
FIG. 2 is an enlarged view of a portion of an example adapter and fixture of the system of FIG. 1.
Figure 3:
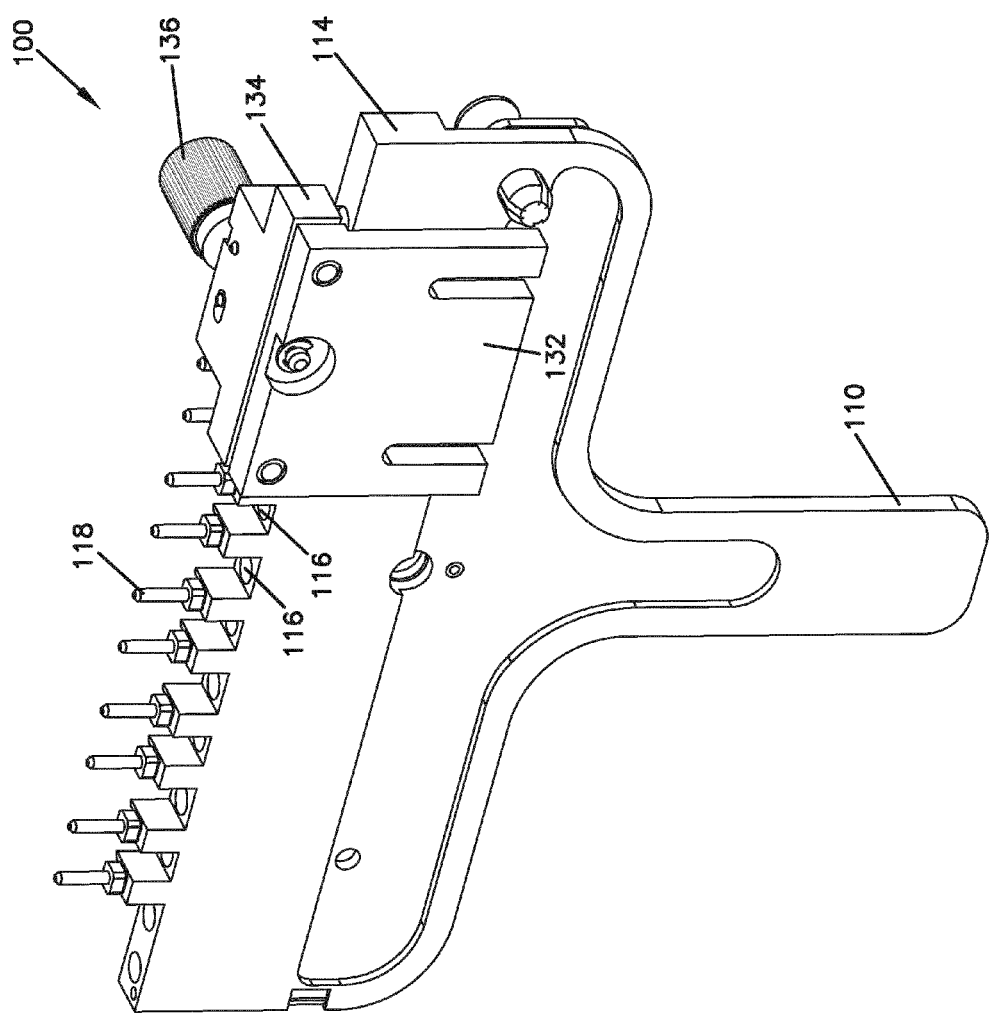
FIG. 3 is a bottom perspective view of the system of FIG. 1.
Figure 4:
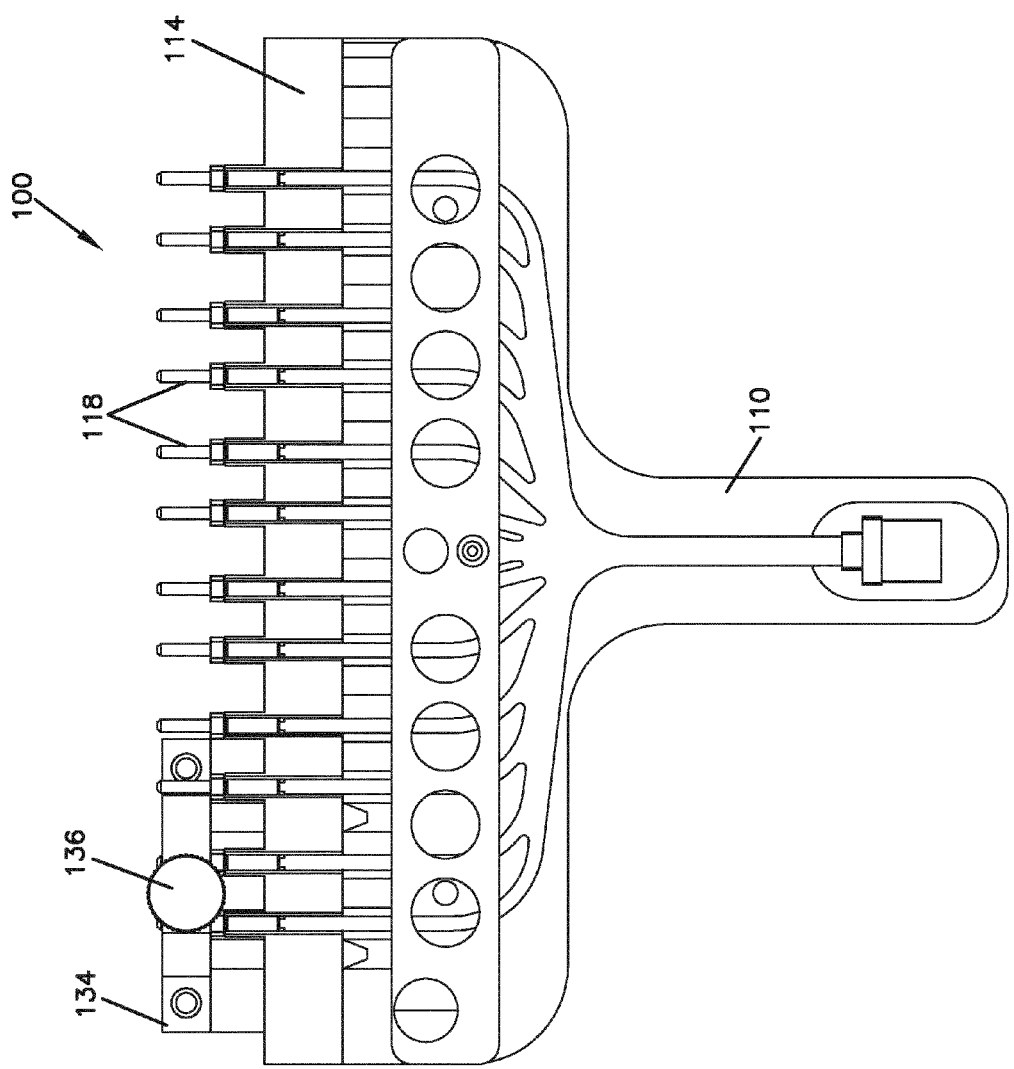
FIG. 4 is a top view of the system of FIG. 1.
Figure 5:
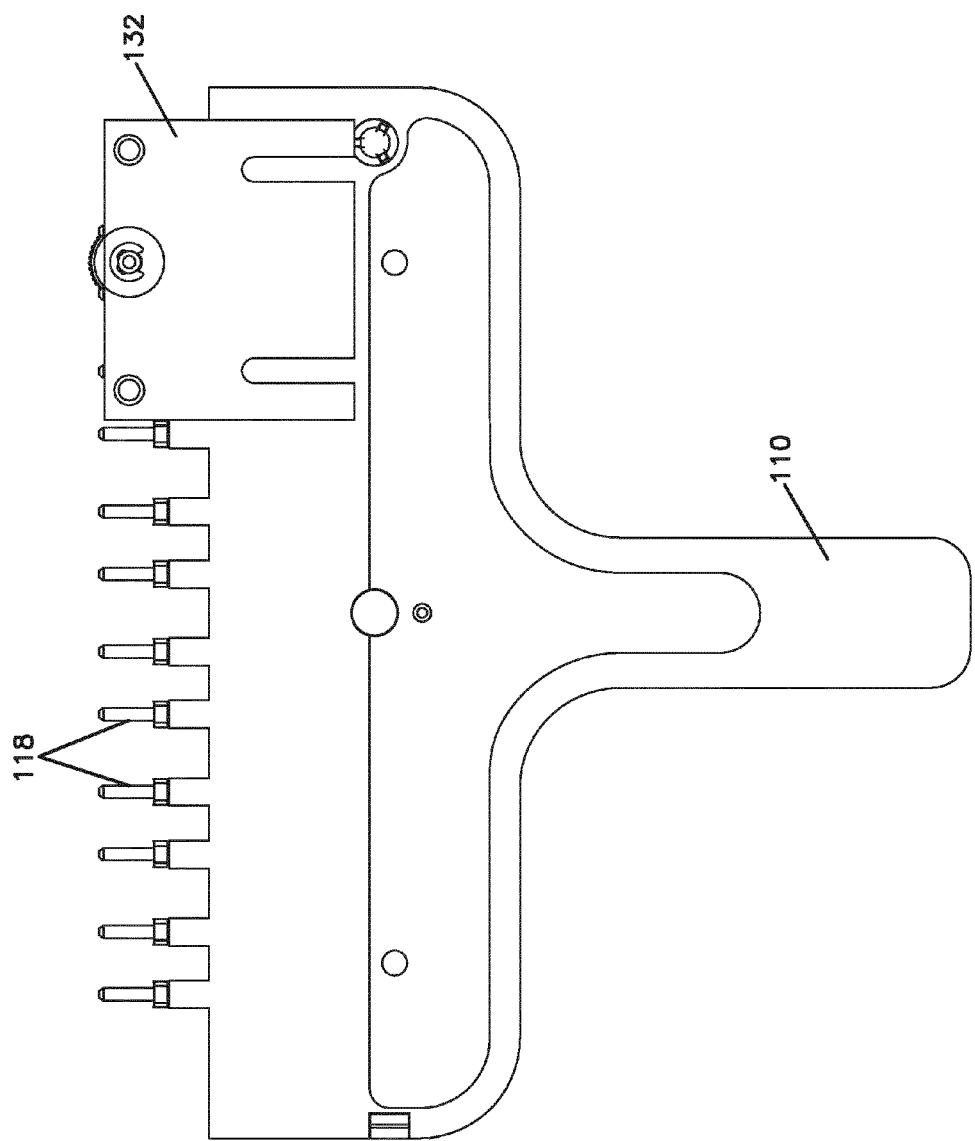
FIG. 5 is a bottom view of the system of FIG. 1.
Figure 6:
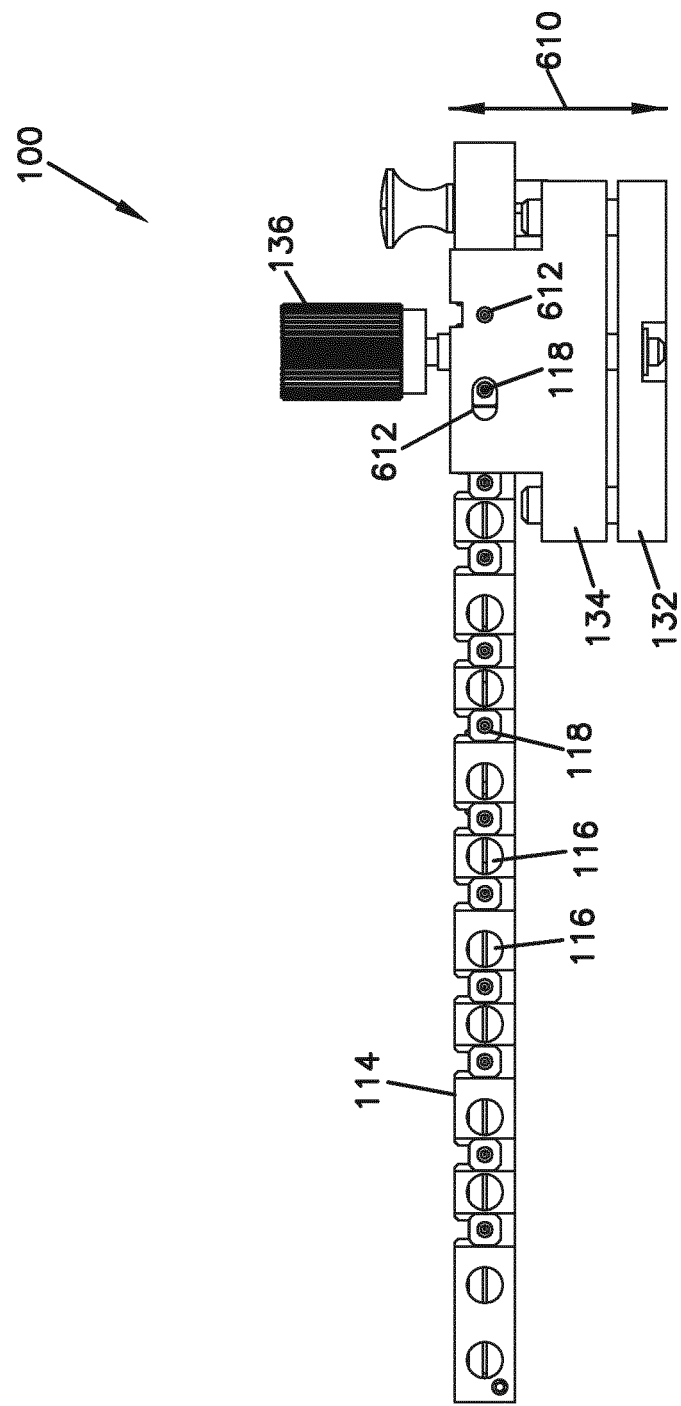
FIG. 6 is a front view of the system of FIG. 1.

The present disclosure relates to systems and methods for inspecting fiber optic cables.

Referring now to FIGS. 1-6, an example system 100 for inspecting fiber optic connectors is provided.

In this example, the system includes a fixture 110 and an adapter 130.

The fixture 110 holds a plurality of fiber optic cables, in this embodiment a flexible circuit 112. The flexible circuit 112 is terminated using a hub 162 and a ferrule 118 holding a fiber therein. The flexible circuit 112 is loaded into the fixture 110 by pivoting a clamp arm 150 about a hinge 154 from a closed position (shown in FIG. 1) into an open position. The clamp arm 150 is locked in the closed position by a fastening member 152. By pulling the fastening member 152, the fastening member 152 is released from the fixture 110, allowing the clamp arm 150 to pivot upwardly about the hinge 154 away from the fixture 110 and the flexible circuit 112 to be positioned in the fixture 110.

Once in position in the fixture 110, the flexible circuit 112 is pulled so that the hub 162 of each of the fibers is seated in a holder 160. The holders 160 position in the ferrules 118 and maintain the ferrules 118 in place during inspection. Once in place, the clamp arm 150 is pivoted back towards the fixture 110 until the fastening member 152 engage the fixture 110 to hold the flex circuit 112 in place.

The fixture 110 also includes a front portion 114 defining a plurality of apertures 116 sized to receive a portion of the adapter 130, as described further below.

Examples of fixtures similar to the fixture 110 described herein are provided in U.S. Patent Application Ser. No. 61/707,480 filed on Sep. 28, 2012, the entirety of which is hereby incorporated by reference. Other configurations are possible.

The adapter 130 includes a base portion 132 and an upper portion 134. The base portion 132 is coupled to the upper portion 134 by an adjustment mechanism 136. By turning the adjustment mechanism 136, the base portion 132 is moved relative to the upper portion 134 in the directions 610 (see FIG. 6). In this manner, the position of the fibers in the ferrules 118 in the fixture 110 are raised or lowered when the fixture 110 is coupled to the adapter 130 (see FIGS. 7-9).

The adapter 130 also includes openings 612, 614 in the adapter 130 to allow the ferrules 118 positioned at the adapter 130 to be accessible through the adapter 130. See FIG. 6. In this example, the opening 612 allows the ferrule 118 under inspection to be accessed. The opening 614 is oversized to allow an adjacent ferrule 118 to be accepted into the adapter 130. The opening 614 is oversized because the spacing between each pair of ferrules 118 of the flexible circuit 112 is different from the spacing between each ferrule 118 making up a pair. The oversized opening 614 accommodates this difference in spacing.

Figure 7:
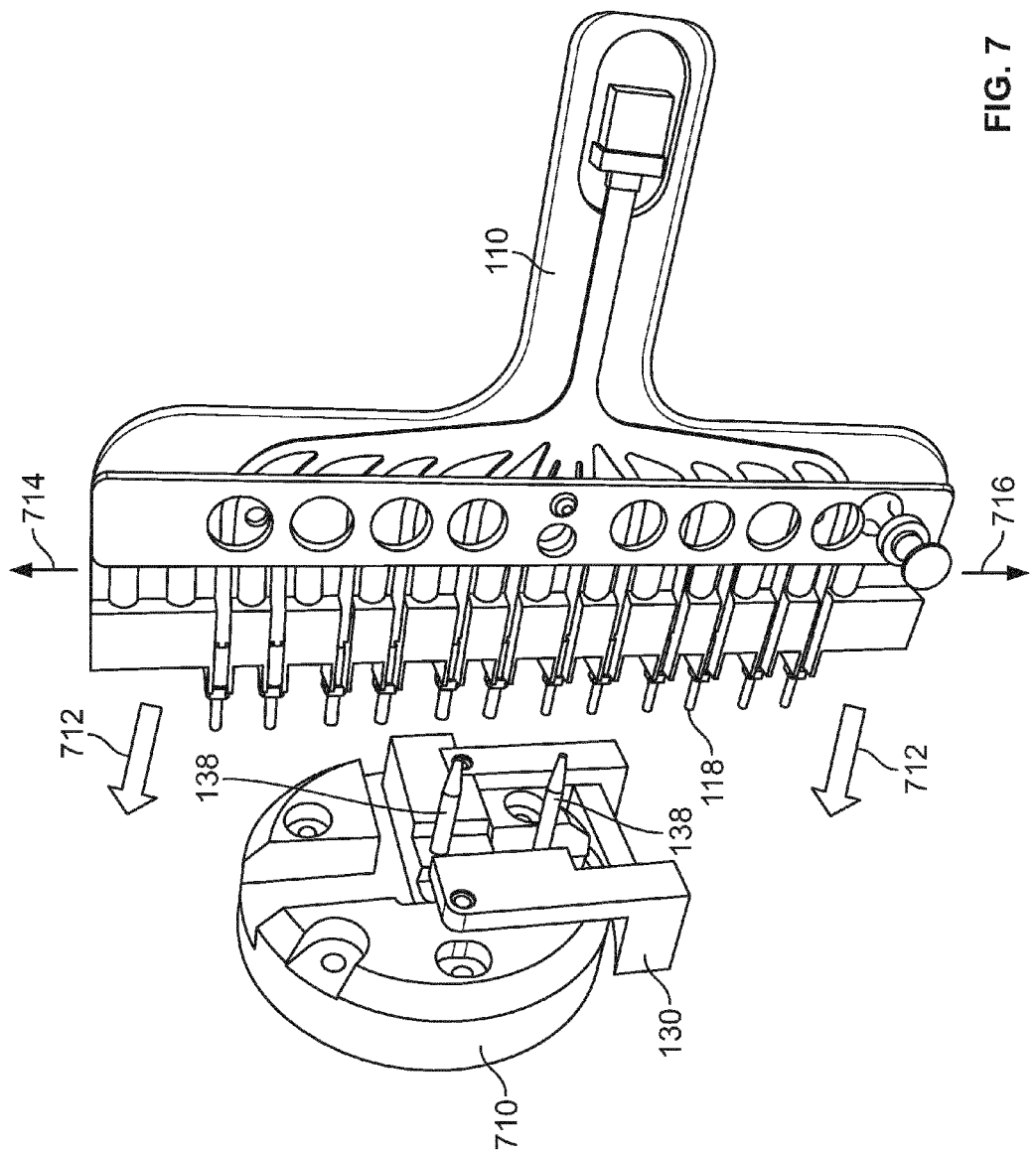
FIG. 7 is a perspective view of the system of FIG. 1 positioned to engage an inspection device.

Referring now to FIG. 7, an example inspection head 710 is shown. The inspection head 710 can be part of an inspection device used to inspect fiber optic cables, such as an interferometer. The adapter 130 is coupled to the inspection head 710.

To couple the adapter 130 to the fixture 110, the fixture 110 is moved in the direction 712 until pin members 138 of the adapter 130 are received in the desired apertures 116 on the fixture 110. Specifically, the apertures 116 that are positioned adjacent to the ferrule 118 to be inspected are selected so that the ferrule 118 is positioned at the inspection head 710. The pin members 138 function to guide the fixture 110 to the appropriate position relative to the inspection device for inspection.

Once the fixture 110 is coupled to the adapter 130, the adapter 130 holds the fixture 110 in place during inspection. If the fiber in the ferrule 118 under inspection needs to be lowered or raised, the adjustment mechanism 136 is turned clockwise or counterclockwise to lower or raise the fixture 110.

When inspection is complete, the fixture 110 is moved in a direction opposite to that of the direction 712 to remove the pin members 138 from the corresponding apertures 116. At that point, the fixture 110 can be moved in the directions 714, 716 and reengaged with the adapter 130 if further inspection of a fiber in another ferrule 118 is desired.

Figure 8:
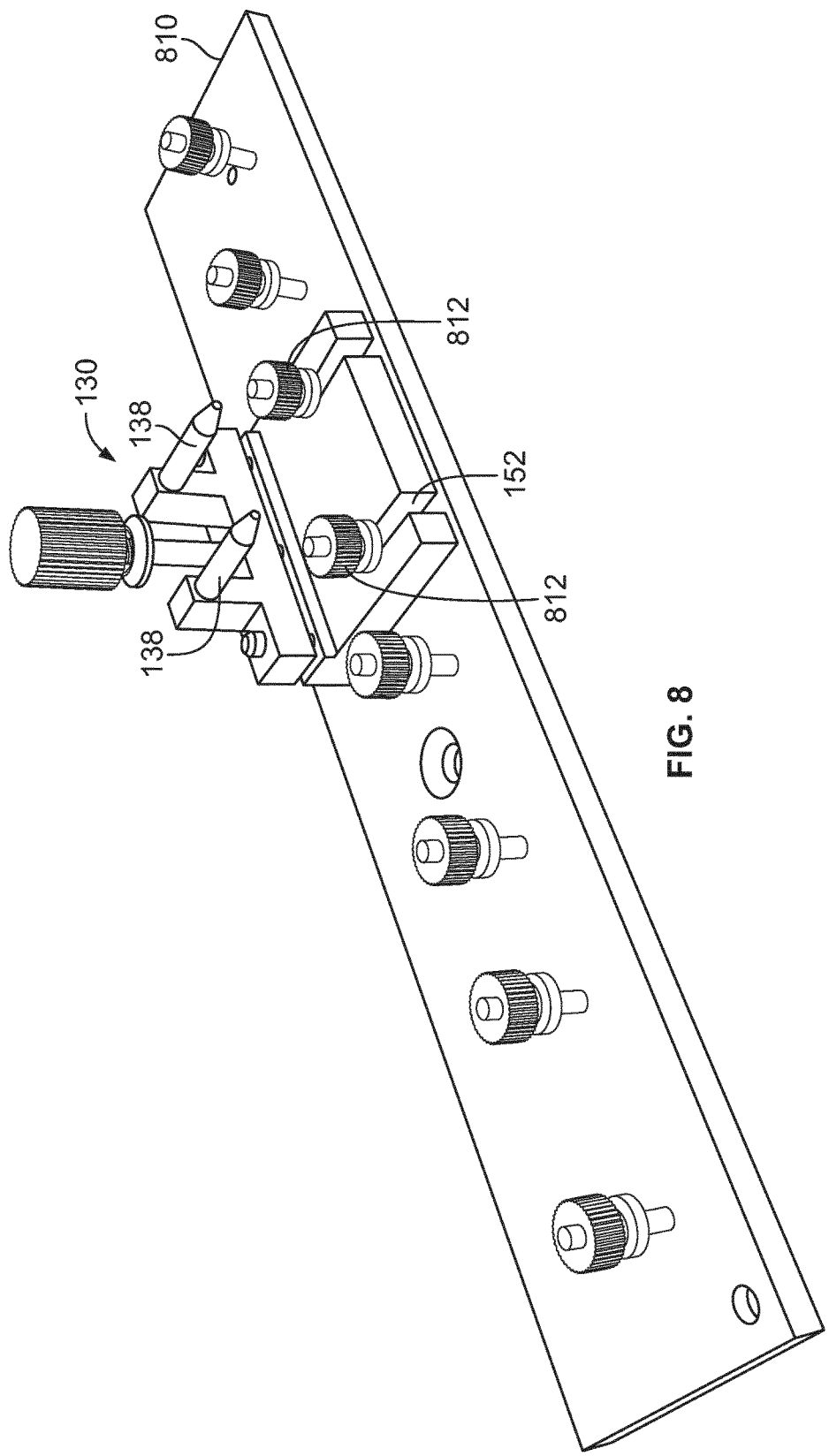
FIG. 8 is a perspective view of an example inspection plate and adapter.
Figure 9:
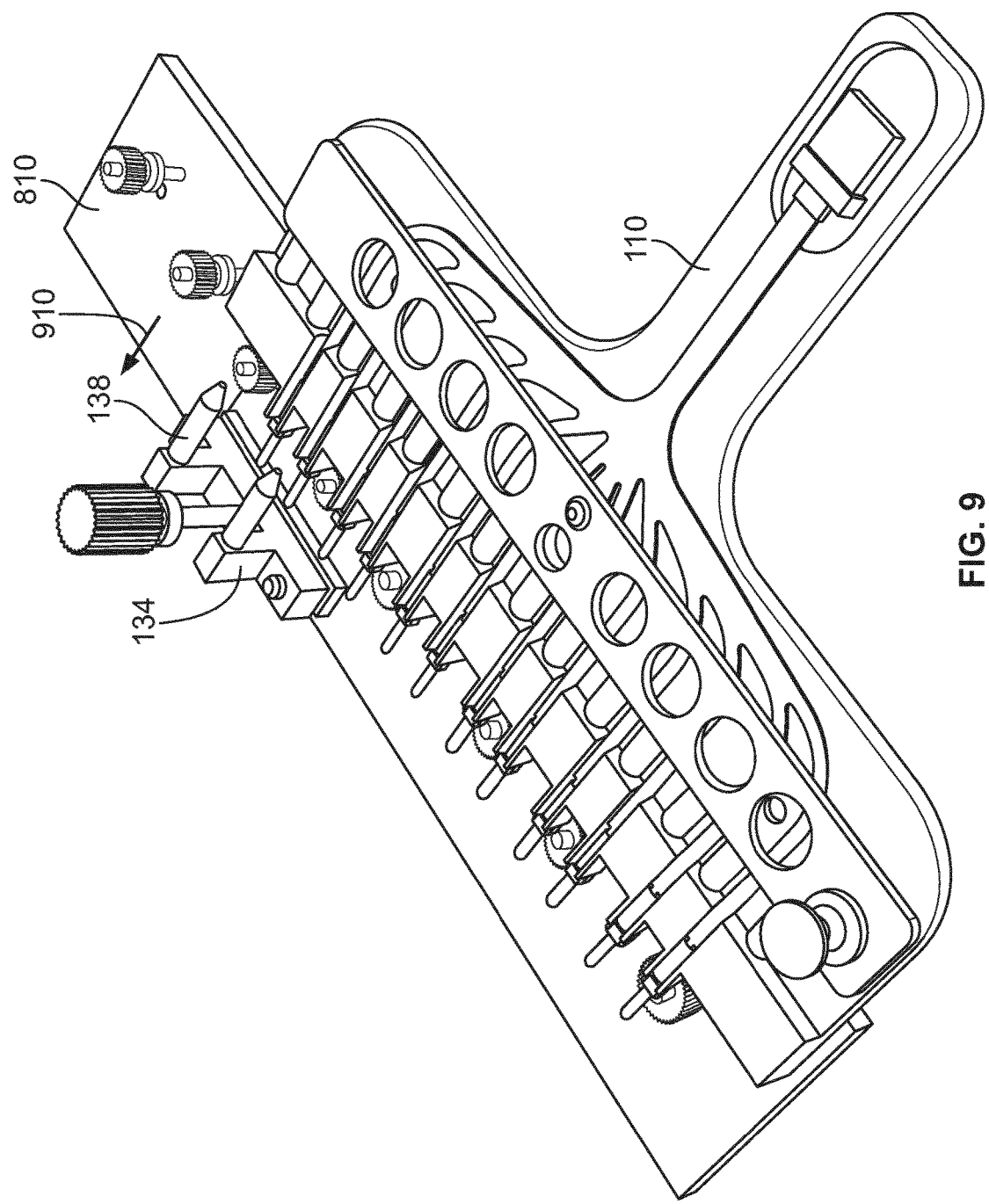
FIG. 9 is a perspective view of the inspection plate and adapter of FIG. 8, along with a fixture including a plurality of fiber optic cables.

Referring now to FIGS. 8-9, an inspection plate 810 is shown. The inspection plate 810 is configured to be mounted to an inspection device, such as a microscope used to inspect fibers.

The adapter 130 is mounted to the inspection plate 810 by attachment mechanisms 812 that are received in grooves defined by the adapter 130. When in place, the attachment mechanism 812 are tightened (e.g., by rotation) to affix the adapter 130 to the inspection plate 810.

For inspection, the fixture 110 is brought in a direction 910 towards the adapter 130 until the pin members 138 are received in the apertures 116 adjacent to the ferrule 118 to be inspected. In this position, the fiber in the ferrule 118 can be inspected.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for inspecting fiber optic cables, the system comprising:
   a fixture including a body configured to hold a plurality of fiber optic cables, the fixture including a front portion defining a plurality of apertures positioned adjacent to ends of the fiber optic cables;
   an adapter having a base portion and an upper portion, the adapter including two or more pin members extending therefrom, the two or more pin members being configured to be positioned in two or more of the plurality of apertures in the fixture to hold the fixture relative to the adapter, and wherein the adapter defines one or more openings through which one or more ferrules of the fiber optic cables held by the fixture are configured to extend therethrough; and
   an adjustment mechanism that couples the base portion to the upper portion, wherein the adjustment mechanism is configured to move the base portion towards and away from the upper portion so that an amount of the one or more ferrules of the fiber optic cables that extends through the openings is increased or decreased.

2. The system of claim 1, wherein the fixture is configured to hold a flexible circuit.

3. The system of claim 2, wherein the fixture includes a clamp arm that pivots between open and closed positions, wherein the flexible circuit is positioned in the fixture when the clamp arm is in the open position, and wherein the clamp arm is moved to the closed position to hold the flexible circuit within the fixture.

4. The system of claim 2, wherein the fixture further includes a plurality of holders configured to hold a plurality of ferrules of the flexible circuit.

5. The system of claim 1, wherein at least one of the openings is oversized to allow adjustment of a height of the ferrules.

6. The system of claim 1, further comprising an inspection plate, wherein the inspection plate is configured to be coupled to an inspection device.

7. The system of claim 6, wherein the inspection plate is coupled to the adapter by an attachment mechanism.

8. The system of claim 7, wherein the attachment mechanism includes a plurality of rotatable pins that are received in grooves defined by the adapter.

9. A system for inspecting fiber optic cables, the system comprising:
   a fixture including a body configured to hold a plurality of fiber optic cables, the fixture including a front portion defining a plurality of apertures positioned adjacent to ends of the fiber optic cables;
   an adapter having a base portion and an upper portion, the adapter including two or more pin members extending therefrom, the two or more pin members being configured to be positioned in two or more of the plurality of apertures in the fixture to hold the fixture relative to the adapter, and wherein the adapter defines one or more openings through which one or more ferrules of the fiber optic cables held by the fixture are configured to extend therethrough;
   an adjustment mechanism that couples the base portion to the upper portion, wherein the adjustment mechanism is configured to move the base portion towards and away from the upper portion so that an amount of the one or more ferrules of the fiber optic cables that extends through the openings is increased or decreased, wherein at least one of the openings is oversized to allow adjustment of a height of the ferrules; and
   an inspection plate, wherein the inspection plate is configured to be coupled to an inspection device.

* * * * *